United States Patent
Huynh (10) Patent No.: US 11,155,959 B2
(45) Date of Patent: Oct. 26, 2021

(54) DENSIFYING A NANOFIBER SHEET USING HEAT AND FORCE

(71) Applicant: Lintec of America, Inc., Richardson, TX (US)

(72) Inventor: Chi Huynh, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 244 days.

(21) Appl. No.: 16/009,578

(22) Filed: Jun. 15, 2018

(65) Prior Publication Data
US 2018/0363237 A1   Dec. 20, 2018

Related U.S. Application Data

(60) Provisional application No. 62/522,163, filed on Jun. 20, 2017.

(51) Int. Cl.
| | | |
|---|---|---|
| D06M 10/04 | (2006.01) | |
| D06C 15/00 | (2006.01) | |
| C01B 32/168 | (2017.01) | |
| D06M 101/40 | (2006.01) | |

(52) U.S. Cl.
CPC .......... *D06M 10/04* (2013.01); *C01B 32/168* (2017.08); *D06C 15/00* (2013.01); *D06M 2101/40* (2013.01)

(58) Field of Classification Search
None
See application file for complete search history.

(56) References Cited

U.S. PATENT DOCUMENTS

| | | |
|---|---|---|
| 7,807,094 B2 | 10/2010 | Kim et al. |
| 8,257,778 B2 | 9/2012 | Larsen et al. |
| 8,926,933 B2 | 1/2015 | Zhang et al. |
| 9,512,543 B2 | 12/2016 | Turner et al. |
| 9,512,545 B2 | 12/2016 | Zhang et al. |

(Continued)

FOREIGN PATENT DOCUMENTS

| | | |
|---|---|---|
| CN | 103964410 | 8/2014 |
| JP | 2010-534772 | 11/2010 |
| JP | 2011-038203 | 2/2011 |

(Continued)

OTHER PUBLICATIONS

International Search Report with Written Opinion received in U.S. PCT Application No. PCT/US2018/037736, dated Aug. 31, 2018, 13 pages.

(Continued)

*Primary Examiner* — Peter L Vajda
*Assistant Examiner* — Adrianna N Konves
(74) *Attorney, Agent, or Firm* — Greenblum & Bernstein, P.L.C.

(57) ABSTRACT

Methods and systems are described for continuously densifying at least one nanofiber sheet using heat and an applied force that can include both compressive and tensile components. Nanofiber sheets densified using these techniques have a more uniform and more highly aligned microstructure than nanofiber sheets densified using a solvent alone. As a result, the nanofiber sheets of the present disclosure have, for example, higher tensile strength and better electrical conductivity than nanofiber sheets densified using other techniques.

5 Claims, 7 Drawing Sheets

(56) References Cited

U.S. PATENT DOCUMENTS

2014/0209235 A1 7/2014 Qian et al.
2015/0147573 A1* 5/2015 Zhang .................... B82Y 10/00
428/408

FOREIGN PATENT DOCUMENTS

| JP | 2012-111691 | 6/2012 |
| JP | 2016-016318 | 2/2016 |
| WO | 2017/131061 | 8/2017 |
| WO | 2016/080526 | 9/2017 |

OTHER PUBLICATIONS

International Preliminary Report on Patentability received in U.S. PCT Application No. PCT/US2018/037736, dated Jan. 2, 2020, 7 pages.
Japanese Office Action dated Jan. 5, 2021 issued in Japanese Patent Application No. 2019-559110 with a corresponding English translation.
Office Action dated June 22, 2021 issued in Japanese patent application No. 2019-559110, along with corresponding English translation

* cited by examiner

Nanofiber forest

FIG. 1

Example reactor for growing nanofibers

DENSIFYING A NANOFIBER SHEET USING HEAT AND FORCE

RELATED APPLICATIONS

This application claims priority under 35 USC § 119(e) to U.S. Provisional Patent Application No. 62/522,163 entitled "Densifying a Nanofiber Sheet Using Heat and Force," filed on Jun. 20, 2017, which is incorporated by reference herein in its entirety.

TECHNICAL FIELD

The present disclosure relates generally to nanofiber fabrication. Specifically, the present disclosure relates to densifying a nanofiber sheet using heat and force.

BACKGROUND

Nanofibers are known to have unusual mechanical, optical, and electronic properties. However, devising nanofiber products that are commercially useful (e.g., can be manipulated and/or integrated into a finished product) has been challenging because of the nanoscale dimensions of the nanofibers. PCT Publication No. WO 2007/015710 is one example of an advance in developing commercially useful embodiments of nanofibers. This publication describes converting a nanofiber "forest" into a nanofiber sheet and/or yarn. Part of the process described in this publication is the "densification" of a nanofiber sheet through the application, and subsequent removal, of a solvent.

SUMMARY

Example 1 is a method comprising: drawing at least one nanofiber forest into at least one nanofiber sheet; and providing, to the at least one nanofiber sheet, heat and a force having a tensile component and a compressive component, wherein the provided heat and the provided force aligns nanofibers within the at least one nanofiber sheet and increases a density of the at least one nanofiber sheet.

Example 2 includes the subject matter of Example 1, wherein at least one of the provided heat, the tensile force component and the compressive component increases a density of the nanofiber sheet by reducing an average spacing between individual nanofibers of the nanofiber sheet.

Example 3 includes the subject matter of either of Example 1 or Example 2, wherein at least one of the provided heat, the tensile force component and the compressive component decreases a number of entanglements between nanofibers of the at least one nanofiber forest.

Example 4 includes the subject matter of any of the preceding Examples, wherein: the at least one nanofiber sheet has a first side and a second side opposite the first side; and at least one of the provided heat, the tensile component and the compressive component are provided to the first side and then provided to the second side.

Example 5 includes the subject matter of Examples 1-3, wherein: the at least one nanofiber sheet has a first side and a second side opposite the first side; and at least one of the provided heat, the tensile component and the compressive component are provided to the first side and the second side simultaneously.

Example 6 includes the subject matter of any of the preceding Examples, wherein the nanofiber sheet is not exposed to a solvent during the providing of the heat and the force.

Example 7 includes the subject matter of any of Examples 1-5, further comprising providing a solvent vapor to the nanofiber sheet concurrent with providing of at least one of the heat and the force to the nanofiber sheet.

Example 8 includes the subject matter of Example 7, further comprising providing a nanoparticle to the nanofiber sheet, the nanoparticle suspended in the solvent vapor.

Example 9 includes the subject matter of Example 7, further comprising providing a colloidal particle to the nanofiber sheet, the colloidal particle suspended in the solvent vapor.

Example 10 includes the subject matter of Example 7, further comprising providing a polymer molecule to nanofiber sheet, the polymer molecule solvated by the solvent vapor.

Example 11 includes the subject matter includes the subject matter of any of the preceding Examples, wherein drawing at least one nanofiber forest into the at least one nanofiber sheet comprises drawing a plurality of nanofiber forests into a corresponding plurality of precursor nanofiber sheets.

Example 12 includes the subject matter of Example 11, wherein the plurality of precursor nanofiber sheets are densified into a single merged nanofiber sheet having a continuous microstructure.

Example 13 includes the subject matter of Example 12, wherein the continuous microstructure comprises a microstructure in which the precursor nanofiber sheets are indistinguishable from one another once densified.

Example 14 includes the subject matter of any of the preceding Examples, wherein heat provided to the at least one nanofiber sheet comprises exposing a first surface of the nanofiber sheet to a surface having a temperature of from 100° C. to 600° C.

Example 15 is a nanofiber processing system comprising: a first heated rod, a second heated rod, and a third heated rod, wherein the first heated rod, the second heated rod and the third heated rod are not coplanar with a reference plane; and a bobbin configured for rotational motion in a first direction.

Example 16 includes the subject matter of Example 15, wherein the reference plane is defined by a plane including the bobbin and a nanofiber forest substrate.

Example 17 includes the subject matter of either of Example 15 or Example 16, wherein none of the first heated rod, the second heated rod and the third heated rod are coplanar with one another.

Example 18 includes the subject matter of any of Examples 15-17, further comprising: at least one substrate; and a nanofiber forest disposed on each of the at least one substrates.

Example 19 includes the subject matter of any of Examples 15-18, further comprising a tension reduction roller disposed between the third heated rod and the bobbin, the tension reduction roller configured for rotational motion in a second direction opposite the first direction.

Example 20 includes the subject matter of any of Examples 15-19, further comprising a guide structure disposed between the bobbin and the third heated rod.

The figures depict various embodiments of the present disclosure for purposes of illustration only. Numerous variations, configurations, and other embodiments will be apparent from the following detailed discussion. Furthermore, as will be appreciated, the figures are not necessarily drawn to scale or intended to limit the described embodiments to the specific configurations shown. For instance, while some figures generally indicate straight lines, right angles, and smooth surfaces, an actual implementation of the disclosed techniques may have less than perfect straight lines and right angles, and some features may have surface topography or otherwise be non-smooth, given real-world limitations of fabrication processes. In short, the figures are provided merely to show example structures.

DETAILED DESCRIPTION

Overview

Embodiments of the present disclosure include methods and systems for continuously densifying at least one nanofiber sheet using heat and an applied force. The applied force can include one or both of compressive and tensile components. Embodiments described herein can be configured as a continuous process so that nanofiber sheet drawing, nanofiber sheet densifying, and in some cases, nanofiber yarn spinning, are performed at different stages within a single or coordinated processing system. In some embodiments, a solvent or solvent vapor may be additionally applied to the nanofiber sheet being densified along with the heat and force. The applied solvent or solvent vapor can enhance the densifying process, and can be used to introduce another material (e.g., a nanoparticle, a colloidal particle, a polymer) into the nanofiber sheet structure, or both. In some examples, the nanofiber sheet processed in a system of the present disclosure can originate from a single source of nanofiber forests. Embodiments also include nanofiber sheets densified according to the processes described herein that have a more uniform and more highly aligned structure than nanofiber sheets densified using other techniques, such as using a solvent alone.

A product of fabricating densified nanofiber sheets using the methods and systems of the present disclosure can be a nanofiber sheet that has a microstructure distinct from nanofiber sheets densified using a solvent. Specifically, by using heat and an applied force that includes both compressive and tensile components to densify a nanofiber sheet, nanofibers within the sheet are more aligned with each other compared to nanofiber sheets densified using a solvent alone, in some examples. This structural difference can cause improvements in mechanical or physical properties (e.g., tensile strength, nanofibers/unit volume of sheet (i.e., density)), and electrical properties (e.g., conductivity) of the nanofiber sheet compared to nanofiber sheets densified using a solvent alone.

Embodiments can also be used for densifying multiple precursor nanofiber sheets together into a single merged densified nanofiber sheet. In these embodiments, a single, merged, and densified sheet of uniform composition and structure can be produced from the multiple precursor nanofiber sheets. That is, even though multiple precursor nanofiber sheets are used, there are no detectable inhomogeneities within the single merged densified nanofiber sheet that would indicate boundaries between the precursor nanofiber sheets. An advantage of these embodiments is fabrication of densified nanofiber sheets that are structurally uniform and have electrical and mechanical properties corresponding to a nanofiber sheet drawn from a single nanofiber forest. In this way, longer, thicker, denser nanofiber sheets and nanofiber yarns can be fabricated from a single, combined densified nanofiber sheet of the present disclosure, as compared to nanofiber sheets and yarns fabricated from a single nanofiber forest using a single nanofiber forest at a time densified using a solvent alone.

Other embodiments and advantages will be appreciated in light of the present disclosure. A discussion of carbon nanofibers, nanofiber forests, and nanofiber sheets follows to provide context for descriptions of embodiments of the present disclosure.

Properties of Carbon Nanofibers and Carbon Nanofiber Sheets

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be used to fabricate nanofiber sheets using the techniques described below. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest").

The dimensions of carbon nanotubes can vary greatly depending on production methods used. For example, the diameter of a carbon nanotube may be from 0.4 nm to 100 nm and its length may range from 10 μm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or tunable. While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and hydrophobicity. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

Nanofiber Forest

Figure 1:
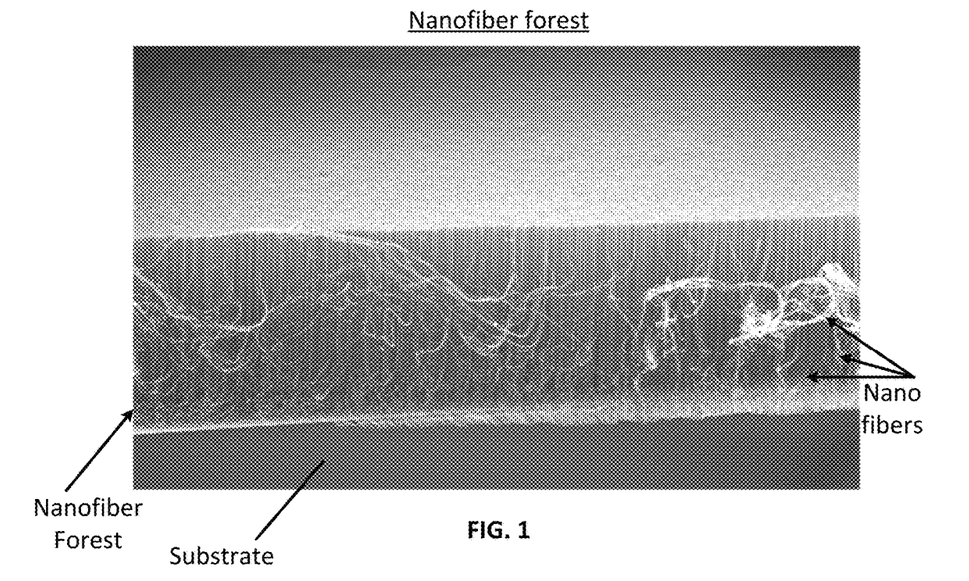
FIG. 1 illustrates an example forest of nanofibers on a substrate, in an embodiment.

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Nanofiber forests as disclosed herein may be relatively dense. Specifically, the disclosed nanofiber forests may have a density of at least 1 billion nanofibers/cm$^2$. In some specific embodiments, a nanofiber forest as described herein may have a density of between 10 billion/cm$^2$ and 30 billion/cm$^2$. In other examples, the nanofiber forest as described herein may have a density in the range of 90 billion nanofibers/cm$^2$. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces.

Example Methods for Producing Nanofiber Forests

Various methods can be used to produce nanofiber forests in accordance with the present disclosure. For example, in some embodiments nanofibers may be grown in a high-temperature furnace. In some embodiments, catalyst may be deposited on a substrate, placed in a reactor and then may be exposed to a fuel compound that is supplied to the reactor. Substrates can withstand temperatures of greater than 800° C. to 1000° C. and may be inert materials. The substrate may comprise stainless steel or aluminum disposed on an underlying silicon (Si) wafer, although other ceramic substrates may be used in place of the Si wafer (e.g., alumina, zirconia, SiO2, glass ceramics). In examples where the nanofibers of the forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers.

Figure 2:
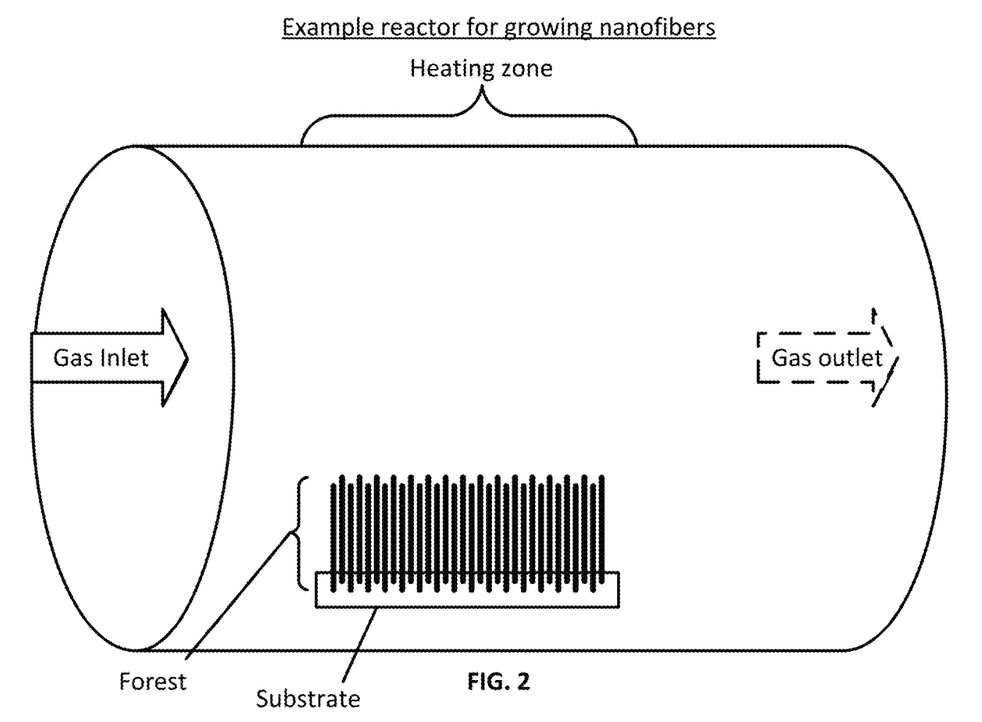
FIG. 2 is a schematic diagram of a reactor for growing nanofibers, in an embodiment.

A diagram of an example reactor for nanofiber growth is shown in FIG. 2. As can be seen in FIG. 2, the reactor may include a heating zone where a substrate can be positioned to facilitate nanofiber forest growth. The reactor also may include a gas inlet where fuel compound(s) and carrier gases may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream. Example methods of adding dopants during deposition of the nanofiber forest are described at paragraph 287 of PCT Publication No. WO 2007/015710, which has been previously incorporated by reference herein in its entirety. Other example methods of doping or providing an additive to the forest include surface coating, dopant injection, or other deposition and/or in situ reactions (e.g., plasma-induced reactions, gas phase reaction, sputtering, chemical vapor deposition). Example additives include polymers (e.g., poly (vinyl alcohol), poly(phenylene tetrapthalamide) type resins, poly(p-phenylene benzobisoxazole), polyacrylonitrile, poly (styrene), poly(ether etherketone) and poly(vinyl pyrrolidone, or derivations and combinations thereof), gases of elements or compounds (e.g., fluorine), diamond, palladium and palladium alloys, among others.

The reaction conditions during nanofiber growth can be altered to adjust the properties of the resulting nanofiber forest. For example, particle size of the catalyst, reaction temperature, gas flow rate and/or the reaction time can be adjusted as needed to produce a nanofiber forest having the desired specifications. In some embodiments, the position of catalyst on the substrate is controlled to form a nanofiber forest having a desired pattern. For example, in some embodiments catalyst is deposited on the substrate in a pattern and the resulting forest grown from the patterned catalyst is similarly patterned. Exemplary catalysts include iron with a buffer layer of silicon oxide ($SiO_2$) or aluminum oxide ($Al_2O_3$). These may be deposited on the substrate using chemical vapor deposition (CVD), pressure assisted chemical vapor deposition (PCVD), electron beam (eBeam) deposition, sputtering, atomic layer deposition (ALD), laser assisted CVD, plasma enhanced CVD, thermal evaporation, various electrochemical methods, among others.

After formation, the nanofiber forest may optionally be modified. For example, in some embodiments, the nanofiber forest may be exposed to a treatment agent such as an oxidizing or reducing agent. In some embodiments, the nanofibers of the forest may optionally be chemically functionalized by a treatment agent. Treatment agent may be introduced to the nanofiber forest by any suitable method, including but not limited to chemical vapor deposition (CVD) or any of the other techniques and additives/dopants presented above. In some embodiments, the nanofiber forest may be modified to form a patterned forest. Patterning of the forest may be accomplished, for example, by selectively removing nanofibers from the forest. Removal can be achieved through chemical or physical means.

Nanofiber Sheet

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end-to-end in a plane. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 µm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

Figure 3:
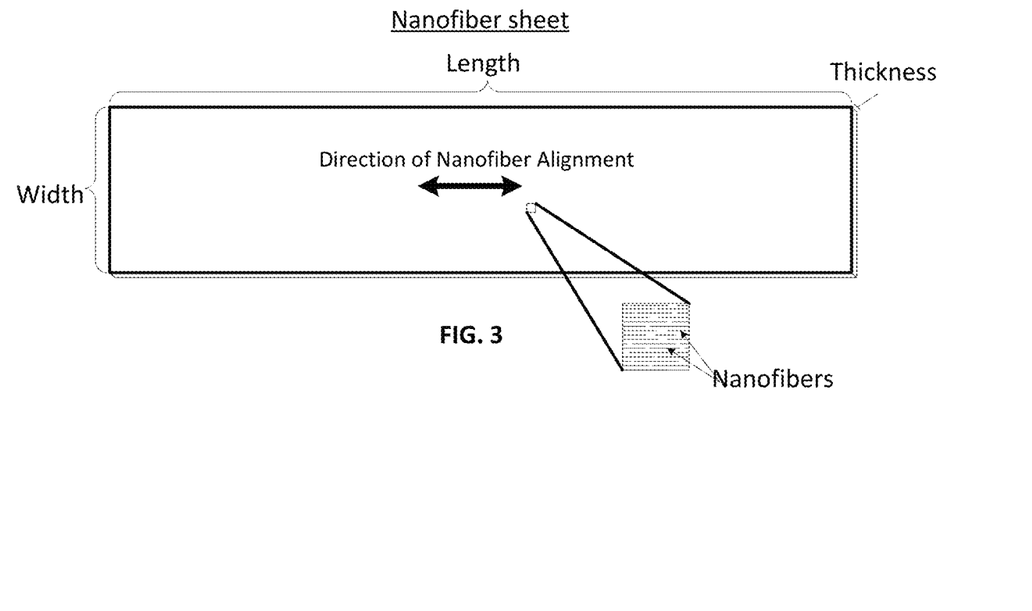
FIG. 3 is an illustration of a nanofiber sheet that identifies relative dimensions of the sheet and schematically illustrates nanofibers within the sheet aligned end-to-end in a plane parallel to a surface of the sheet, in an embodiment.

An illustration of an example nanofiber sheet is shown in FIG. 3 with relative dimensions illustrated. As can be seen in FIG. 3, the axis in which the nanofibers are aligned end-to-end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be stacked on top of one another to form a multi-layered sheet stack. Nanofiber sheets may be stacked to have the same direction of nanofiber alignment or to have different directions of nanofiber alignment. Any number of nanofiber sheets may be stacked on top of one another to form a multi-layered nanofiber sheet stack. For example, in some embodiments, a nanofiber sheet stack may include 2, 3, 4, 5, 10, or more individual nanofiber sheets. The direction of nanofiber alignment on adjoining sheets in a stack may differ by less than 1°, less than 5° or less than 10°. In other embodiments, the direction of nanofiber alignment on adjoining or interleaved sheets may differ by more than 40°, more than 45°, more than 60°, more than 80°, or more than 85°. In specific embodiments, the direction of nanofiber alignment on adjoining or interleaved sheets may be 90°. Multi-layer sheet stacks may include other materials such as polymers, metals and adhesives in between individual nonfiber sheets.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4.

Figure 4:
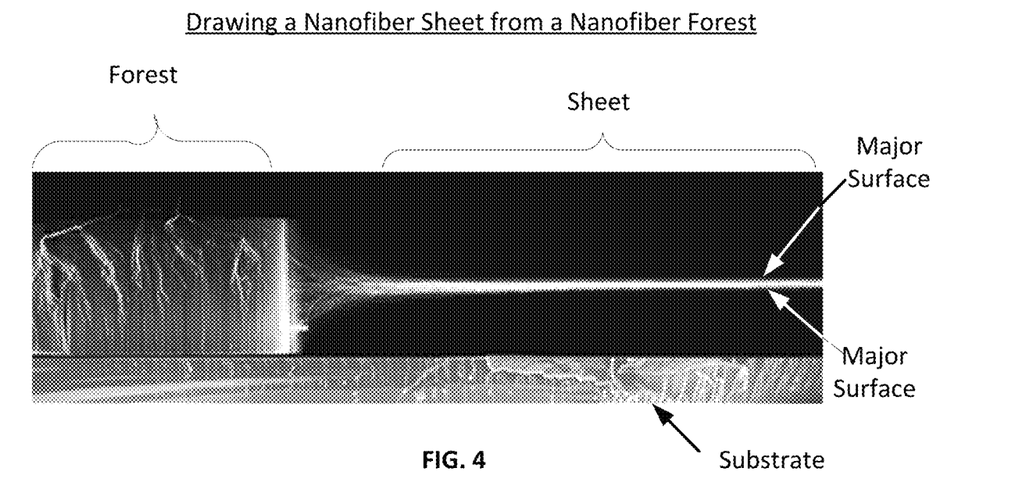
FIG. 4 is an image of a nanofiber sheet being laterally drawn from a nanofiber forest, the nanofibers aligning from end-to-end as schematically shown in FIG. 3.

As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, prior to metallization and/or polymer infiltration, as disclosed herein may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Densifying Methods

As indicated above, a nanofiber sheet can be densified by applying, and subsequently removing, a solvent. This solvent densification process, however, causes the nanofiber sheet to dimensionally shrink unless attached to an underlying substrate. During this dimensional shrinking, physical entanglements between nanofibers in the sheet, created during drawing the sheet from the forest, are retained. The entanglements between nanofibers limits the extent to which a nanofiber sheet can be densified because freedom of movement of individual nanofibers can be restricted by these entanglements. That is, a nanofiber can sometimes be prevented from become straighter and more aligned with proximate nanofibers because its movement is prevented by the physical impingement of another nanofiber. These retained entanglements thus limit an extent to which a nanofiber sheet can be densified by a solvent. When processing this type of nanofiber sheet into a yarn, additional twisting is generally needed to increase the density of the yarn so as to overcome these entanglements.

Figure 5:
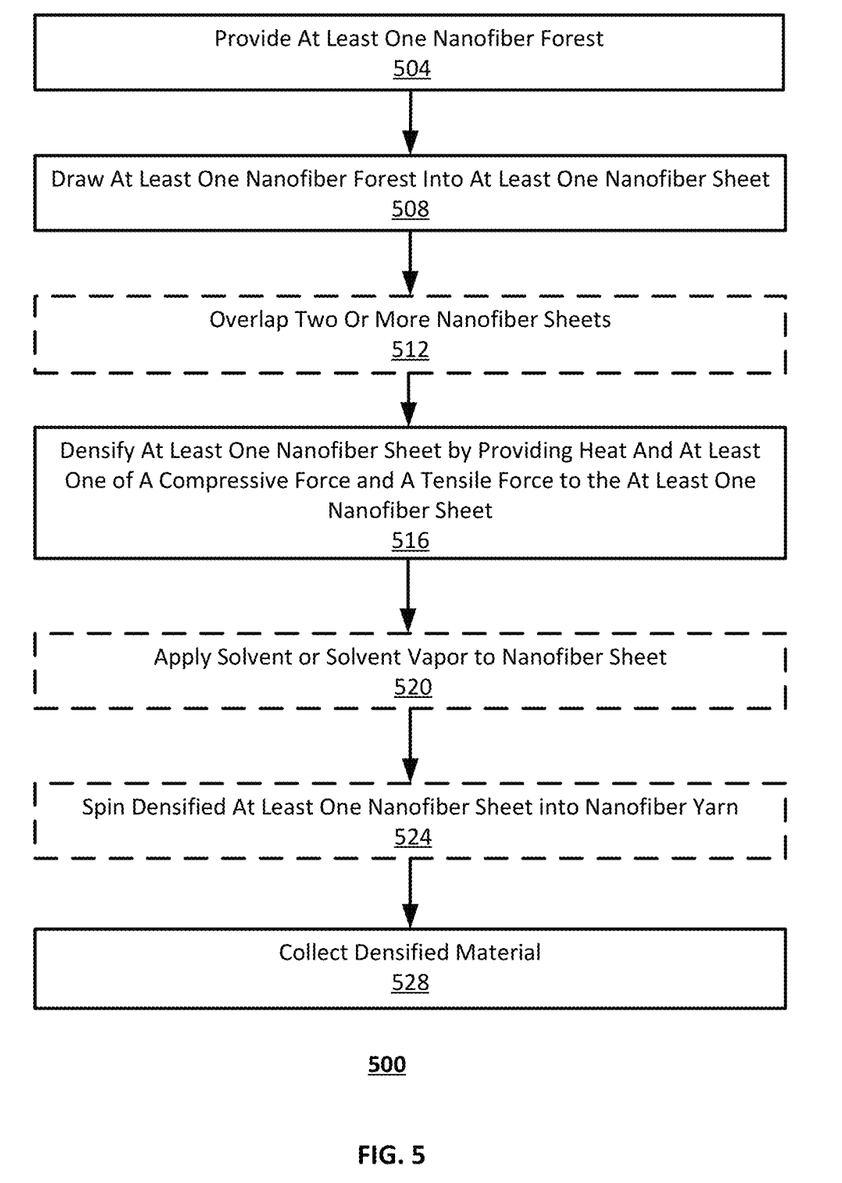
FIG. 5 is a method flow diagram of an example method for densifying at least one nanofiber sheet using a combination of heat and force, in an embodiment.

Unlike this solvent-alone densification technique, embodiments disclosed herein densify a nanofiber sheet by applying heat and a force that, in some examples, includes either or both of compressive and tensile components. FIG. 5 is a method flow diagram that illustrates a method 500 for densifying at least one nanofiber sheet using a combination of heat and force, in an embodiment. FIGS. 6A-6C, and FIGS. 7A and 7B illustrate example systems for performing the method 500.

The method 500 begins by providing 504 at least one nanofiber forest and drawing 508 the at least one nanofiber forest into at least one nanofiber sheet. The nanofiber forest can be fabricated and drawn, for example, using the techniques described above in the context of FIGS. 1 to 4, as well as those techniques described in PCT Publication No. WO 2007/015710, which is incorporated by reference herein in its entirety. In embodiments in which more than one nanofiber forest is provided 504 and drawn 508 into more than one nanofiber sheet, the two or more nanofiber sheets can be physically overlapped 512. A schematic illustration of overlapping nanofiber sheets is shown in FIG. 7B.

Regardless of the number of nanofiber sheets processed according to the method 500, the at least one nanofiber sheet is densified 516 by providing heat, and a force having at least one of a compressive component and a tensile component.

Example systems for providing heat and at least one of a compressive force and a tensile force to the nanofiber sheet are depicted in FIGS. 6A, 6B, 6C, 7A, and 7B, each of which is described below in more detail.

In some embodiments, during or after densification 516, a solvent or solvent vapor can be applied 520 to the nanofiber sheet. Application 520 of a solvent or solvent vapor can further densify a nanofiber sheet or be used to introduce a second material to within the nanofiber sheet. For example, polymer molecules, non-volatile or low-volatile molecules, graphene nanoparticles, and other nanoparticles can be provided to a surface or into an interior of the nanofiber sheet using the solvent or solvent vapor as a vehicle.

In some embodiments, a densified nanofiber sheet can be spun 524 into a nanofiber yarn. In the example of a nanofiber yarn produced from a nanofiber sheet of the present disclosure, the mechanical and electrical properties of the yarn are improved over yarns produced from conventionally solvent-only densified nanofiber sheets.

The densified material, whether a nanofiber yarn or a nanofiber sheet, can be collected 528, for example wound around a bobbin or spool.

Densifying Systems

FIGS. 6A, 6B, 6C, 7A, and 7B schematically depict various embodiments, and aspects thereof, of systems for densifying at least one nanofiber sheet using heat and force, in embodiments of the present disclosure.

Figure 6A:
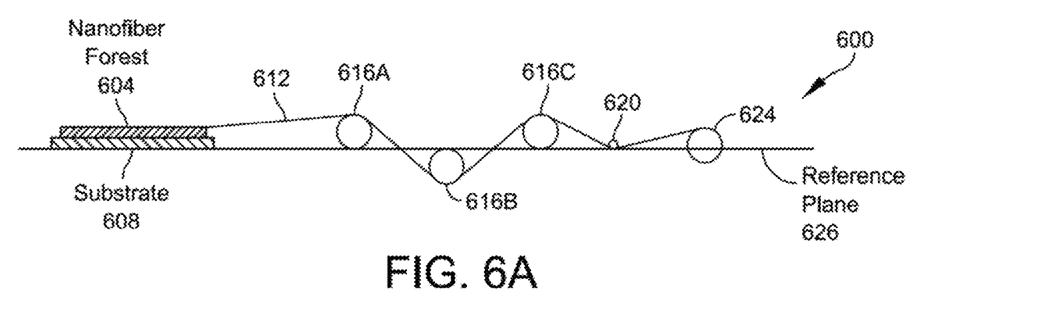
FIGS. 6A and 6C illustrate side views of an example system for densifying nanofiber sheets using heat and force, in embodiments.

FIG. 6A illustrates a side view of an example system 600 for densifying at least one nanofiber sheet using heat and force, in an embodiment. The example system 600 includes a nanofiber forest 604 disposed on a substrate 608, heated rods 616A-616C, a guide structure 620, and a bobbin 624.

The nanofiber forest 604 can be fabricated according to the methods described above in the context of FIGS. 1-4. The substrate 608 can be a growth substrate on which the nanofiber forest 604 is grown or a replacement substrate. For example, as described in U.S. Pat. No. 9,964,783, which is incorporated by reference herein in its entirety, a nanofiber forest 604 can be transferred to a substrate 608 that is different from the growth substrate. The transferred nanofiber forest can be manipulated so as to reorient an angle of the nanofibers with respect to the underlying substrate 608 prior to drawing the forest 604 into a nanofiber sheet.

Regardless of the type of substrate 608, the nanofiber forest 604 (or forests) is drawn into a nanofiber sheet 612. One surface of the nanofiber sheet 612 is then placed in contact with a "top" surface of a heated rod 616A. The example system 600 also includes a second heated rod 616B and a third heated rod 616C that the nanofiber sheet is passed under and over, respectively.

It will be appreciated that the number of heated rods (generically 616) can be varied in different embodiments of the present disclosure. It will be appreciated that using at least two heated rods 616 will enable exposure of both sides of the nanofiber sheet 612 to heat and force. However, it will be appreciated that other devices can accomplish this goal, such as a pair of adjacent heated rollers that are arranged one on top of another (i.e., a "rolling mill" configuration) that the nanofiber sheet 612 is rolled through, among other examples. Furthermore, it will be appreciated that the heated rods 616 may not themselves be heated, but rather heat can be applied to the nanofiber sheet 612 from an external source as the nanofiber sheet is drawn over and against the rods 616. Examples of external heat sources include, but are not limited to, forced hot air sources, IR heaters, radiant heaters, and others.

Each heated rod 616 can perform at least two functions. A first function is providing heat to a portion of the nanofiber sheet 612 that is in contact with the heated rod 616. The heat can cause individual nanofibers to become straighter, and decrease a number (or extent) of entanglements between proximately disposed nanofibers within the sheet. One or both of these enable a reduction in space between individual nanofibers and an increase in alignment between the individual nanofibers within the sheet 612. A second function is to provide a force on the nanofiber sheet 612, which can also cause straightening and increased alignment between nanofibers, thus densifying the sheet as a whole. In these examples, the force is supplied by drawing the nanofiber sheet 612 through the system shown. That is, by changing the orientation of the sheet relative to one or more heated rods 616 and using the rods 616 as a surface on which the sheet 612 is contacted (much like a household steam iron), the drawing force (supplied by a bobbin, for example) can be transformed to include both tensile and compressive forces. The relative magnitude of these forces can be changed based on the angle at which the sheet 612 is drawn over a given rod 616.

Regardless of the whether the straightening and increased alignment is caused by heat or force (or both), one result is to increase a density of nanofibers per unit volume of nanofiber sheet 612 as the nanofiber sheet 612 as a whole decreases in cross-sectional area and volume. The increased density and alignment can increase a tensile strength of the densified nanofiber sheet 612, increases a tensile strength and can also increase an electrical conductivity of the nanofiber sheet 612. More generally, the densification methods and systems described herein increase properties that are a function of a strength of van der Waals force interactions between nanofibers of the sheet because the individual nanofibers in the sheet are straightened and disposed more proximately to one another as a result of the straightening (and reduction in entanglements).

A heated rod 616 can include an electrical heating element or other heat source that can produce a surface temperature within any of the following ranges: from 100° C. to 200° C.; from 100° C. to 500° C.; from 100° C. to 600° C.; from 500° C. to 600° C.; from 50° C. to 100° C.; from 100° C. to 200° C.; from 200° C. to 300° C.; from 250° C. to 300° C.; from 150° C. to 200° C.; from 300° C. to 600° C.; from 400° C. to 600° C.; from 400° C. to 500° C.; from 400° C. to 500° C. The heated rod 616 can also be coated with a low surface energy, but thermally stable, coating (e.g., polytetrafluoroethylene) so as to reduce a coefficient of friction between the heated rod 616 and the nanofiber sheet 612 during contact therebetween.

In some examples, the heated rod 616 can also include one or more ports defined within a contact surface through which a solvent or solvent vapor may pass. The solvent or solvent vapor (whether steam, toluene, ethanol, methanol, etc.) can be used to further densify the nanofiber sheet 612 and/or improve alignment between individual nanofibers. In some examples, the solvent or solvent vapor can also be used as a vehicle to provide another material to a surface or interior of the nanofiber sheet 612. For example, a polymer (e.g., an adhesive) can be solvated in a solvent and then applied to the nanofiber sheet 612 through ports defined in a contact surface of the heated rod 616. In another example, colloidal particles or nanoparticles (e.g., silver nanoparticles, graphene nanoparticles) can be provided to a surface and/or an interior of the nanofiber sheet 612 upon suspension in a solvent and application of the solvent or solvent vapor to the nanofiber sheet 612.

The system 600 also includes a guide structure 620 disposed between the heated rod 616C and the bobbin 624. The guide structure 620 helps position the nanofiber sheet 612 relative to the bobbin 624 so that the nanofiber sheet winds consistently and uniformly on the bobbin 624. That is, the guide structure 620 maintains an orientation and alignment of the nanofiber sheet 612 with respect to the bobbin 624 to facilitate winding of the nanofiber sheet 612 on the bobbin 624.

The nanofiber sheet 612 can be drawn over the heated rods 616 by a bobbin 624. A first end of the nanofiber sheet 612 is attached to the bobbin 624. The bobbin 624 is then rotated in a direction so as to provide a force to the nanofiber sheet 612 that causes the nanofiber sheet to be drawn over (and in contact with) the heated rods 616 from the forest 604. Rotation of the bobbin 624 can be accomplished using any of a variety of mechanisms, including an electric motor, bearings, and combinations thereof. Ultimately, the densified material (whether a nanofiber sheet or a nanofiber yarn spun from the nanofiber sheet) is collected by the bobbin 624.

As described above, the drawing force applied by the bobbin 624 that ultimately draws the nanofiber sheet 612 from the nanofiber forest 604 can be converted, in cooperation with properly placed heated rods 616, into a force having both a tensile component and a compressive component. These components can contribute to the alignment of nanofibers within the nanofiber sheet 612 and the densification of the nanofiber sheet 612 itself.

Figure 6B:
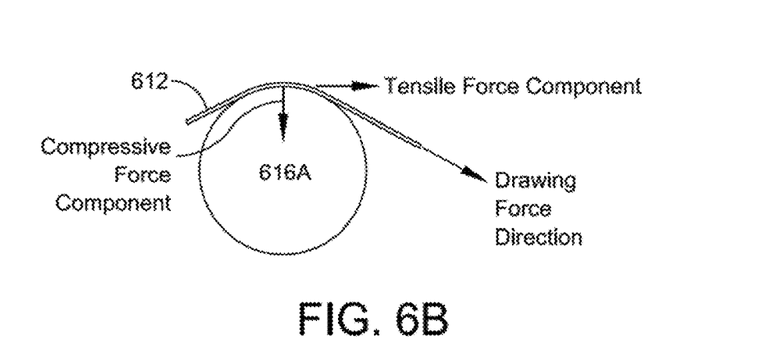
FIG. 6B schematically illustrates components of forces experienced by a nanofiber sheet when drawn over and in contact with a component of the example system shown in FIGS. 6A and 6C.

Converting the drawing force from the bobbin 624 into a force having a tensile component and a compressive component can be accomplished by placing at least one of the heated rods 616, and or one or more guide structures 620 at a location that is offset from a reference plane 626 containing the nanofiber forest 604 and the bobbin 624. This offset from the reference plane 626 containing the nanofiber forest 604 and the bobbin 624 causes the nanofiber sheet 612 to bend around the at least one heated rod 616. As shown in FIG. 6B, the bending or conforming of the nanofiber sheet 612 around a heated rod 616 causes the drawing force provided by the bobbin 624 to the nanofiber sheet 612 to have two components: a compressive force component (equivalently referred to as a "vertical force component") and a tensile force component (equivalently referred to as a "horizontal force component"). Both of these forces facilitate alignment of nanofibers and densification of the nanofiber sheet 612. The extent of alignment and densification can be increased when the force components are applied to the nanofiber sheet 612 with heat. In another example the extent of alignment and densification can be increased when the force components are applied to the nanofiber sheet 612 with heat and a solvent or solvent vapor. In some examples herein, one or both of the compressive and tensile forces can have values within any of the following ranges: from 0.1 Newtons (N)/cm of sheet width to 1 N/cm of sheet width; from 0.1 N/cm of sheet width to 2 N/cm of sheet width; from 0.1 N/cm of sheet width to 5 N/cm of sheet width; from 0.1 N/cm of sheet width to 10 N/cm of sheet width; and from 1 N/cm of sheet width to 100 N/cm of sheet width.

Figure 6C:
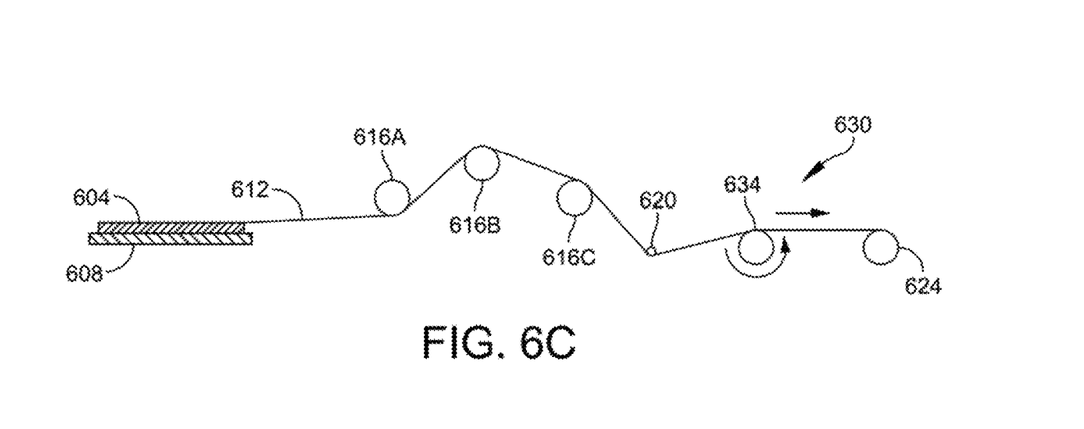

FIG. 6C illustrates an alternative configuration 630 of the system 600. In the alternative configuration 630, the arrangement of the heated rods 616 is different than that of the system 600. As shown, the heated rod 616A is arranged so that the nanofiber sheet 612 makes contact with the heated rod 616A on an "underside" surface of the heated rod 616A and then makes contact on a "top surface" of the heated rod 616B. This is the opposite order of contact from that shown and described above in the context of FIG. 6A. The system 630 also includes a guide structure 620 disposed between the heated rod 616C and the bobbin 624. The guide structure 620 helps position the nanofiber sheet 612 relative to the bobbin 624 so that the nanofiber sheet winds consistently and uniformly on the bobbin 624. That is, the guide structure 620 maintains an orientation and alignment of the nanofiber sheet 612 with respect to the bobbin 624 to facilitate winding of the nanofiber sheet 612 on the bobbin 624.

FIG. 6C also includes a tension reduction roller 634. This optional tension reduction roller 634 rotates in a direction that opposes a direction of travel of the nanofiber sheet 612 (as indicated by the arrows in FIG. 6C) by rotating in a direction opposite a direction of rotation of the bobbin 624. This opposing rotation reduces a force exerted on the nanofiber sheet 612 by the bobbin 624 at a location of the nanofiber sheet between the bobbin 624 and the guide structure 620. In some embodiments, the tension reduction roller 634 is connected to a resilient element (e.g., a spring) so that the tension reduction roller 634 can travel vertically relative to the heated rods 616, thus further controlling tension on the nanofiber sheet 612.

In some embodiments, the relative magnitudes of the compressive and tensile components applied to the nanofiber sheet 612 at each of the heated rods 616A-616C can be varied by the placement of each of the heated rods 616A-616C relative to one another and relative to the reference plane 626. For example, placing the heated rod 616B directly under the heated rod 616A will increase a compressive component experienced by the nanofiber sheet 612 at the heated rod 616A. Alternatively, placing heated rod 616B and the heated rod 616A horizontally separated from one another and immediately on either side of the reference plane 626 will increase a tensile component of the applied force experienced by the nanofiber sheet 612 relative to the compressive component. These and other configurations of the heated rod 616 can affect the microstructure and the physical and electrical properties of the nanofiber sheet 612 upon densification. In some examples, and angle of the heated rod 616B (measured between on an imaginary ray connecting centers of 616A and 616B and the intersection between the imaginary ray and the reference plane 626) can be within any of the following ranges: from 5° to 90°, from 5° to 45°, from 45° to 90°, from 1° to 30°, from 30° to 60°, from 60° to 90°, from 45° to 160°; from 90° to 160°. It will be appreciated that generally as an angle increases, a compressive component of the force also increases.

Figure 7A:
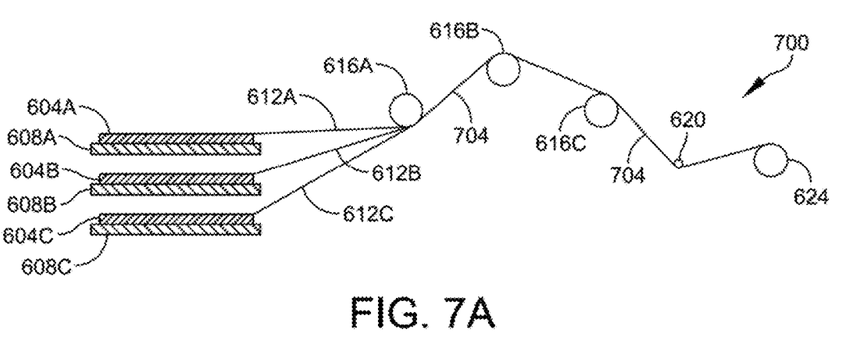
FIG. 7A illustrates a side view of an example system for simultaneously densifying more than one nanofiber sheet at a time into a single merged nanofiber sheet using heat and force, in an embodiment.
Figure 7B:
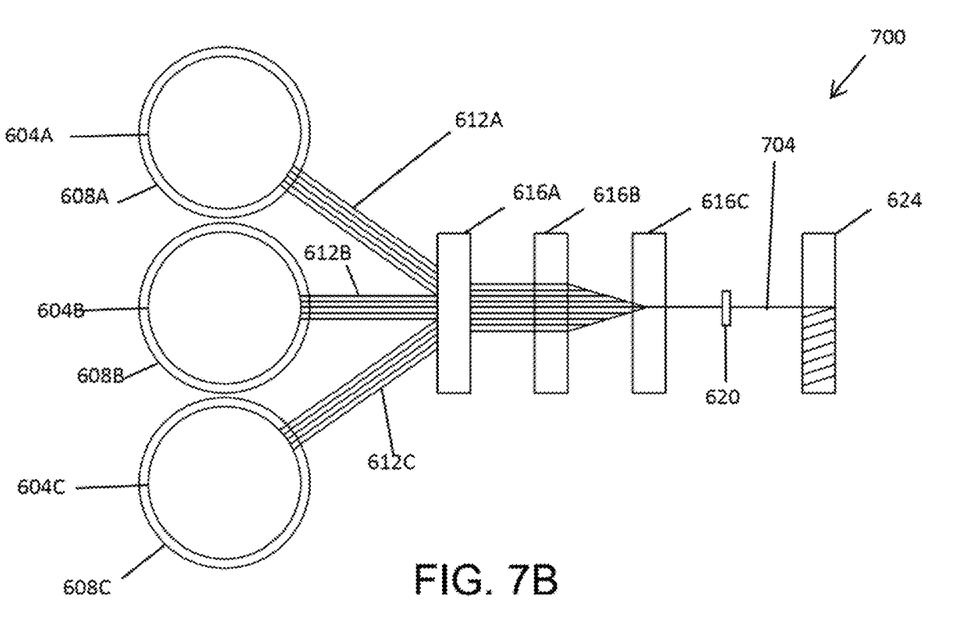
FIG. 7B illustrates a plan view of the example system of FIG. 7A, in an embodiment.

FIG. 7A illustrates a side view of a system 700 for densifying multiple nanofiber forests into a single nanofiber sheet. FIG. 7B illustrates a plan view of the alternative embodiment system 700. Concurrent reference to FIGS. 7A and 7B will facilitate explanation.

The system 700 includes many of the elements already described above including heated rods 616A-616C, guide structure 620, and bobbin 624. In addition to the previously described elements, the system 700 includes three nanofiber forests 604A, 604B, and 604C, each of which is disposed on a corresponding substrate 608A, 608B, and 608C. Each of the nanofiber forests 604A, 604B, and 604C is drawn into a corresponding precursor nanofiber sheet 612A, 612B, and 612C. The three nanofiber sheets 612A, 612B, and 612C are aligned with one another at the first heated rod 616A. Upon heating and applying tensile and compressive forces to the three nanofiber sheets 612A, 612B, and 612C at the heated rod 616A (and optionally in the example shown, heated rods 616B and 616C), the aligned three nanofiber sheets 612A-612C are densified into a single merged nanofiber sheet 704 that has a continuous microstructure. That is, the microstructure of the single merged nanofiber sheet 704 does not contain discontinuities corresponding to the precursor nanofiber sheets 612A, 612B, and 612C, but rather has a structure, nanofiber alignment, and sheet density equivalent to that of a densified nanofiber sheet fabricated from a single precursor nanofiber sheet 612.

In the example scenario shown in FIG. 7B, a width of the nanofiber sheet decreases during densification compared to a width of an as-drawn precursor nanofiber sheet 612A-612C. The narrower configuration can be referred to as a "nanofiber ribbon." In this example, a dramatic reduction in width corresponding to nanofiber ribbon formation is shown occurring at heated rod 616C. However, in some examples a reduction in width of the densified sheet 704 into a nanofiber ribbon is more gradual than the example shown in FIG. 7B, which is emphasized in the figure for convenience of explanation. In some examples, a point at which a nanofiber ribbon forms can be between heated rods 616A and 616B, 616B and 616C, or 616C and bobbin 624. The point at which a nanofiber ribbon forms from the nanofiber sheet can be a function of a number of nanofiber sheets densified into a single merged sheet, a drawing force, a ratio of the compressive component of the force to the tensile component of the force, temperature of a heated rod (or rods) used to densify the nanofiber sheet(s), combinations thereof, among other factors. Other examples of ribbon formation are shown and described in the context of FIGS. 9A to 9C.

In some cases, materials such as nanoparticles can be added to the single (composite) nanofiber sheet before the individual precursor sheets are combined. For instance, conductive nanoparticles, graphene particles or a solvent can be deposited on or between precursor sheets 612A, 612B and/or 612C. Once formed into single merged nanofiber sheet 704, the additives can be incorporated into the single composite sheet and may uniformly or non-uniformly disposed in the single composite sheet.

Figure 8:
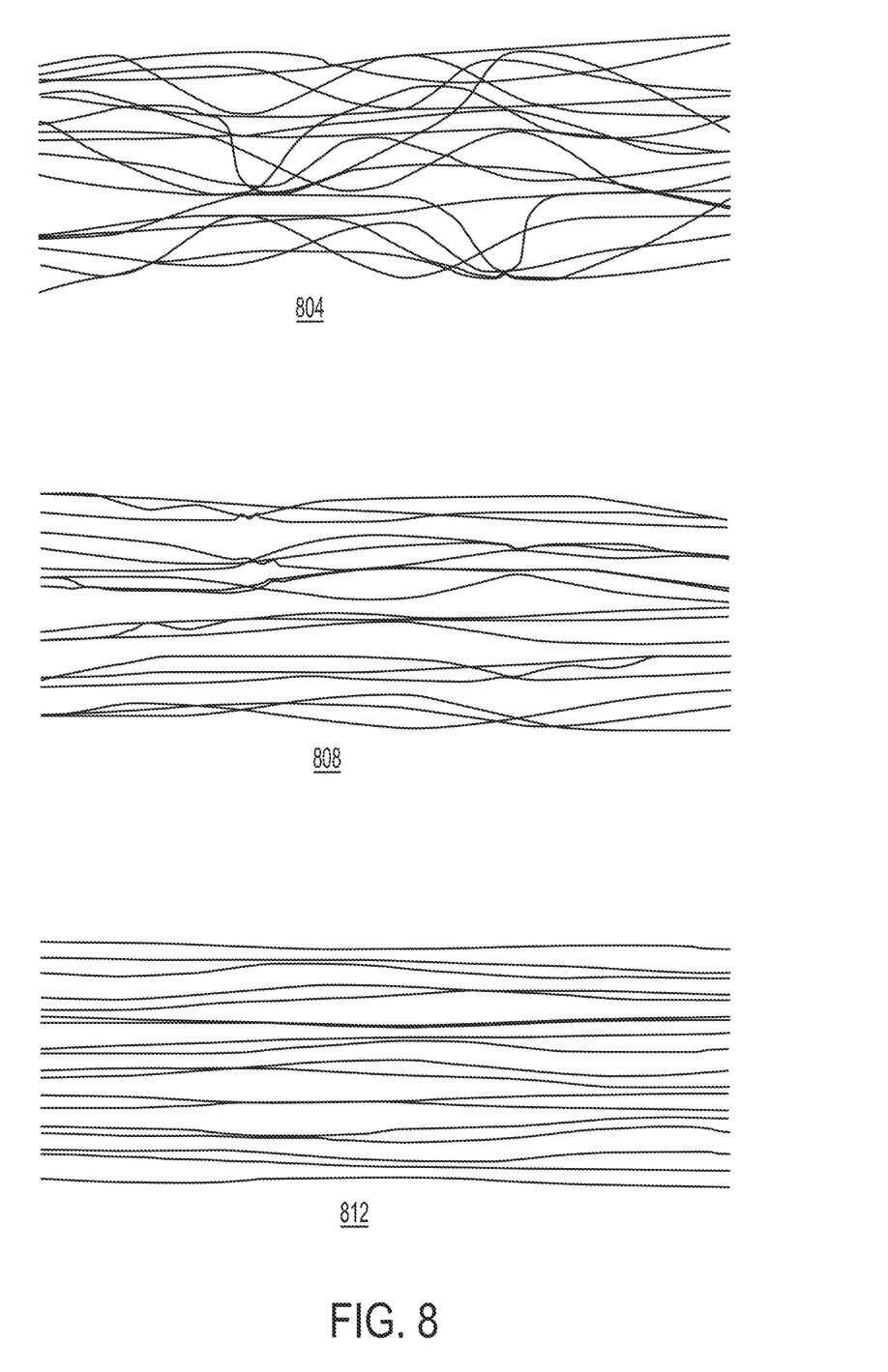
FIG. 8 schematically illustrates progressive alignment of individual nanofibers in an nanofiber sheet upon repeated application of heat and force, in an embodiment.

The effect of aligning nanofibers and densifying a nanofiber sheet according to embodiments of the present disclosure is schematically illustrated in FIG. 8. The configuration 804 illustrates a nanofiber sheet in an as-drawn state prior to any densification or alignment between nanofibers. As can be seen, the individual nanofibers are entangled due in part to each individual nanofiber being conformed in a plurality of different directions.

The configuration 808 illustrates a nanofiber sheet processed according to an embodiment of the present disclosure. That is, a nanofiber sheet densified using heat and a force having compressive and tensile components will have a microstructure characterized by individual nanofiber conformations that are straighter than in the as-drawn state, and that are disposed closer together. This has the effect of increasing a density of a nanofiber sheet because more of these straighter and less entangled nanofibers occupy a unit of volume within the nanofiber sheet compared to the less straight and more entangled nanofibers shown in FIG. 8.

The configuration 812 illustrates a nanofiber sheet that has been repeatedly densified according to embodiments of the present disclosure. As shown, repeated application of the methods and systems described herein produces a nanofiber sheet having a microstructure of highly aligned, minimally entangled nanofibers, and as a result a highly dense nanofiber sheet. Nanofiber sheets having nanofiber alignment and density such as that illustrated in 812 will have improved mechanical properties and electrical properties as a result of the highly aligned and dense microstructure.

Figure 9A:
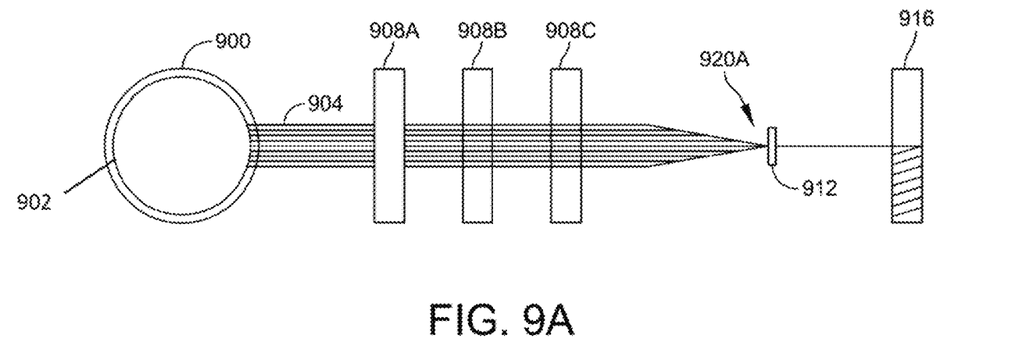
FIGS. 9A, 9B, and 9C illustrate plan views of a nanofiber sheet drawn according to different processing conditions, in embodiments.
Figure 9B:
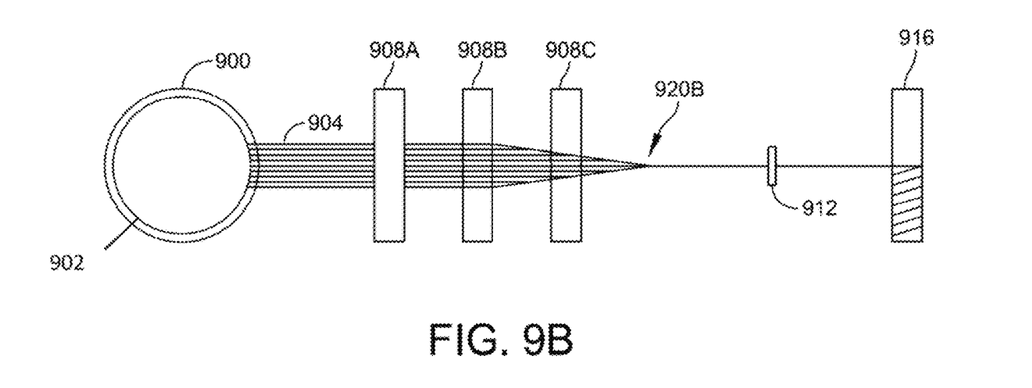
Figure 9C:
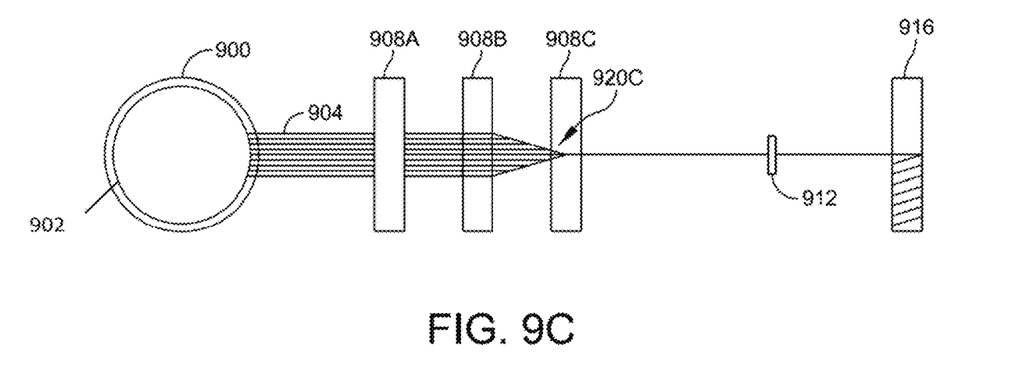

FIGS. 9A, 9B, and 9C illustrate three plan views of a nanofiber sheet drawn from a nanofiber forest according to three different processing conditions, in embodiments. Each of the plan views of FIGS. 9A, 9B, and 9C includes elements previously described, including a nanofiber forest 902 on a substrate 900, a nanofiber sheet 904 drawn therefrom, heated rods 908A-908C, a guide structure 912, and a bobbin 916.

The FIGS. 9A, 9B, 9C illustrate a point 920A, 920B, and 920C, respectively, at which a densified nanofiber sheet reconfigures itself into a narrower, denser nanofiber ribbon as a result of the heat and forces applied, as described above. As indicated above in the context of FIG. 7B, the location of the point 920A-920C can be a function of one or more of a temperature, a drawing force magnitude, and relative magnitudes of the tensile and compressive components of the drawing force that are applied to the nanofiber sheet, among other factors. As shown FIG. 9A, the nanofiber sheet reconfigures itself into a nanofiber ribbon between the third heated rod 908C and the guide structure 912. This location (after the third heated rod 908C and proximate to the bobbin 916) has empirically been found to produce exceptionally dense nanofiber ribbons that in turn can be processed into dense nanofiber yarns. In an example, a nanofiber ribbon produced according to FIG. 9A can be twisted into a nanofiber yarn with a reduced twist angle of the nanofibers of approximately from 5° to 10°, while having the same or better density, tensile strength, and electrical conductivity as a solvent-only densified forest twisted with a yarn with a twist angle of 15° or more.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A nanofiber processing system comprising:
   a first heated rod,
   a second heated rod that is located on a different plane from the first heated rod to angularly receive a nanofiber sheet from the first heated rod, and
   a third heated rod that is located on a different plane from the second heated rod to angularly receive the nanofiber sheet from the second heated rod,
   wherein the first heated rod, the second heated rod and the third heated rod are not coplanar with a reference plane, and
   wherein each of the first heated rod, the second heated rod and the third heated rod applies both a tensile force and a compressive force while applying heat to densify the nanofiber sheet; and
   a bobbin configured for rotational motion in a first direction,
   wherein the reference plane is defined by
      a plane including the bobbin and a nanofiber forest substrate, or a plane including the bobbin and a highest positioned nanofiber forest substrate among a plurality of nanofiber forest substrates.

2. The nanofiber processing system of claim 1, wherein each of the first heated rod, the second heated rod and the third heated rod provides heat to a portion of the nanofiber sheet that is in contact with a respective heated rod.

3. The nanofiber processing system of claim 1, further comprising a tension reduction roller disposed between the third heated rod and the bobbin, the tension reduction roller configured for rotational motion in a second direction opposite the first direction.

4. The nanofiber processing system of claim 1, further comprising a guide structure disposed between the bobbin and the third heated rod.

5. The nanofiber processing system of claim 1, wherein the first heated rod, the second heated rod and the third heated rod are configured to densify the nanofiber sheet without using a solvent.

\* \* \* \* \*